United States Patent [19]
Wood

[11] Patent Number: 5,692,543
[45] Date of Patent: Dec. 2, 1997

[54] LINING OF LATERAL PIPELINES WITH A LINER HAVING A SEALING COLLAR

[75] Inventor: Eric Wood, deceased, late of Peel, United Kingdom, by Miranda Jane Bull, administrator

[73] Assignee: Insituform (Netherlands) B.V., Netherlands

[21] Appl. No.: 454,373

[22] PCT Filed: Sep. 9, 1993

[86] PCT No.: PCT/GB93/01838

§ 371 Date: Aug. 7, 1995

§ 102(e) Date: Aug. 7, 1995

[87] PCT Pub. No.: WO94/13998

PCT Pub. Date: Jun. 24, 1994

[51] Int. Cl.⁶ ............................................. F16L 55/16
[52] U.S. Cl. ........................... 138/98; 138/97; 264/269; 156/94
[58] Field of Search ....................... 138/97, 98; 264/269; 156/94, 98; 285/15

[56] References Cited

U.S. PATENT DOCUMENTS 5,340,160 8/1994 Meijers et al. ..................... 285/55 X

FOREIGN PATENT DOCUMENTS

| | | |
|---|---|---|
| 518 521 A2 | 12/1992 | European Pat. Off. |
| 39 29 558 A1 | 3/1991 | Germany |
| 40 31 949 A1 | 4/1992 | Germany |
| 2 041 147 | 9/1980 | United Kingdom |
| WO91/07619 | 5/1991 | WIPO |
| WO91/16568 | 10/1991 | WIPO |

*Primary Examiner*—Patrick Brinson
*Attorney, Agent, or Firm*—Cowan, Liebowitz & Latman, P.C.; Michael I. Wolfson

[57] ABSTRACT

A method and apparatus is disclosed for lining a lateral pipe branching off of a main pipe with a flexible resin absorbent tubular lining portion having an integral sealing end which includes a flexible resin absorbent end collar portion and a preformed sealing collar having a body portion with an aperture and a rim. The body portion being located against a portion of the main pipe with the resin absorbent collar portion therebetween and the rim being located in a portion of the lateral pipe wherein the preformed sealing collar seals the region where the lateral pipe meets the main pipe.

14 Claims, 5 Drawing Sheets

LINING OF LATERAL PIPELINES WITH A LINER HAVING A SEALING COLLAR

This invention relates to the lining of pipelines and passageways, and in particular has reference to the lining of underground pipelines and passageways which are known as "laterals, which are pipelines and passageways which connect for example a main sewer pipe to a consumer point such as a domestic dwelling or other building.

The invention relates to a lining for laterals, a method of lining laterals and a launcher apparatus for applying the lining to the lateral.

Basically, in a sewerage system, a main sewer pipe will run underground directly along the line of a main street or thoroughfare, and the users of the system will be connected to the main sewer pipe by means of lateral pipes which extend transversely off the main sewer pipe to user points on opposite sides of the road, street or thoroughfare.

The laterals tend to meet the sewer pipe at either of 2 angles namely 45 degrees or 90 degrees, although because of the antiquity of some of the sewer systems at least in countries like the United Kingdom, the lateral may meet the main sewer pipe at any angle, provided of course that the lateral can perform its function of discharging sewage and other effluent into the main sewer.

There has been known now for a number of years a lining process for the lining of main sewer pipes wherein a flexible lining tube includes a resin absorbent layer which is impregnated with curable synthetic resin. The lining tube is urged by a fluid pressure onto the surface of the sewer and is held in position until the resin cures, whereby a hard rehabilitating lining forms on the sewer surface. The lining in effect is a pipe within a pipe and becomes freestanding when curing has been completed, which provides an extremely effective improvement of the sewer surface.

More recently, there has been a demand for and a need to reline the lateral pipes using mainly a lining tube of the same basic construction as the lining tube which is used for the main sewer pipe, and a number of proposals for methods and apparatus have already been made in order to meet this requirement.

We for example have effected a number of developments in this area, and details of these developments are disclosed in the following patent specifications British Patent Numbers: 2,091,611; 2,092,493, 2,096,265; British Parent Application Numbers: 8527700; 9127315.1; European Patent Number 0241719; U.S. Pat. Nos.: 4,786,345; 4,677,472; 5,044,824; U.S. patent application Nos. 532,866; 07/419, 068; International Patent Application Numbers: PCT/GB91/00364; PCT/GB91/00628.

Because of the nature of the layout of main sewer pipe and laterals it is generally recognised that to insert a lining into a lateral, the best method is to evert the lining tube into the lateral by a "launcher" type apparatus which is positioned inside the main sewer. A main reason for proceeding in this way is that access to the lateral from the consumer point is inconvenient to the user, and frequently users will object strongly to working for effecting lateral lining, from a position inside the dwelling or building. It is obviously much better if the contractor can perform the lining operation from inside the main sewer as the consumer is therefore in no way disturbed other than to have the service cut off for a short period whilst the lateral lining takes place.

In "launcher" apparatus, the apparatus is designed so as to have a pressure enclosure so that fluent medium under pressure can be applied to that enclosure, the enclosure has an outlet and is adapted so that the tube to be everted into the lateral extends from the outlet, and then a collar or flange thereof can be held in relation to the outlet so that by pressurising the enclosure the tube is everted into the lateral. The tube may be and preferably is enclosed in a carrier tube which simply forms a carrier for the lining tube and everts with the lining tube into the lateral. When the lining tube is in position, the carrier tube is removed so that it can be reused. A carrier tube is particularly important when the lining tube is one which is impregnated with a curable resin, the carrier tube being in such arrangement a tube of a rubber like material such as neoprene, which is reinforced with fibrous scrim.

One of the difficulties in effecting a lateral lining is to provide an effective sealing for the lining tube around the outlet of the lateral where it meets the main sewer. If the sealing is not effective, the lining tube can slip or it can ruck and folds may be left therein when it is finally placed in the lateral, and the present invention seeks to provide a means and method for overcoming this problem.

In accordance with the invention in a first aspect there is provided a lining for lining of a lateral pipe branding off from an underground pipeline or passageway, characterised in that a lining tube at one end is provided with a preformed sealing collar adapted to conform and seal to the inner face of the piping in the region where said lateral is connected to a mains pipe.

In accordance with the present invention in a second aspect, a lateral lining method comprises using a preformed collar of a sheet material which under pressure will conform to the shape of the main sewer pipe and will effectively seal around the lateral connection to the main pipe, and wherein a said collar is attached to the underside of a flange or collar of the lining tube, and wherein a "launcher" holds the sealing collar and lining collar adjacent the lateral opening, and when the pressure chamber is pressurised, the lining tube is everted through the sealing collar and lining tube collar into the lateral.

The "launcher" may be provided with a carrier tube in which the lining tube is contained.

The lining tube may be of the type provided with a resin absorbent layer which is impregnated with curable resin, and the lining tube is held in position on the lateral surface until the curable resin is cured to form a rigid lining on said lateral surface.

Preferably, in the preforming of the sealing collar, the collar is formed from a sheet of synthetic plastics material such as polyninyl chloride and the central edge of the collar has an upwardly turned rim which is for engagement inside the lateral, said rim lying on a cylindrical plane having its axis inclined relative to the remainder of a collar at the same angle at which the lateral is inclined relative to the main pipe.

The upper edge of the said rim may be outwardly turned so as to provide a lip which serves as a means of gripping the lining collar when applied thereto.

The lining collar may be adhered to the sealing collar by means of a suitable adhesive or other bonding material. The invention also provides a sealing collar for use in connection with the method as aforesaid.

In yet a further aspect the invention provides a launcher apparatus for launching the lining as aforesaid, characterised by means for mounting the sealing collar by its edges thereon, jacking means for jacking the mounted sealing collar unto the main underground pipeline or passageway, around the lateral pipe, and a pressure chamber adapted to be supplied with fluid under pressure to evert the lining through the collar onto the lateral pipe surface.

3

An embodiment of the present invention will now be described, by way of example, with reference to the accompanying drawings, wherein.

Figure 1:
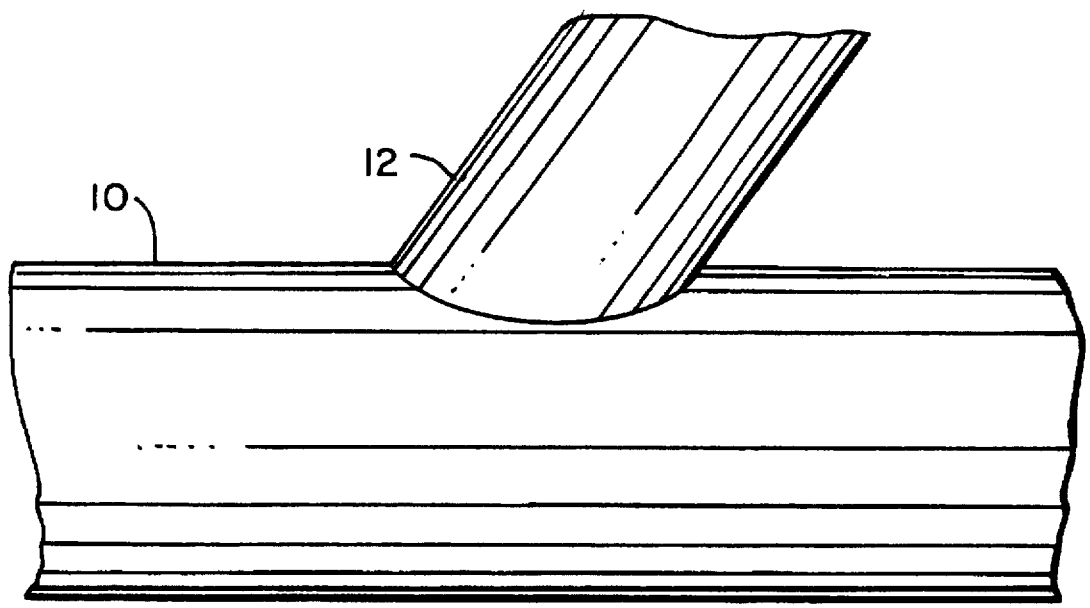
FIG. 1 shows an underground pipeline or passageway and a lateral meeting same at an angle.

Referring to the drawings, and firstly to FIG. 1, an underground pipeline or passageway (10) such as a main sewer is intersected by a side or lateral connection pipe (12) at an angle, typically 45 degrees.

The apparatus and process to be described are for providing the lateral (12) with a lining tube to rehabilitate or repair same.

The lining tube may be of any suitable construction, but typically will be a tube of fibrous felt material which is impregnated with a curable synthetic resin. Such impregnated tubes are now widely used for the lining of underground pipelines and passageways, and will not be described in further detail herein except to say that the tubes are held by fluid pressure against the surfaces to be lined, and are held in this condition until the resin cures when the pressure can be removed leaving the hard lining tube comprising cured resin with feld embedded therein, in position. Any suitable type of lining tube may be used however in the present invention.

Figure 2:
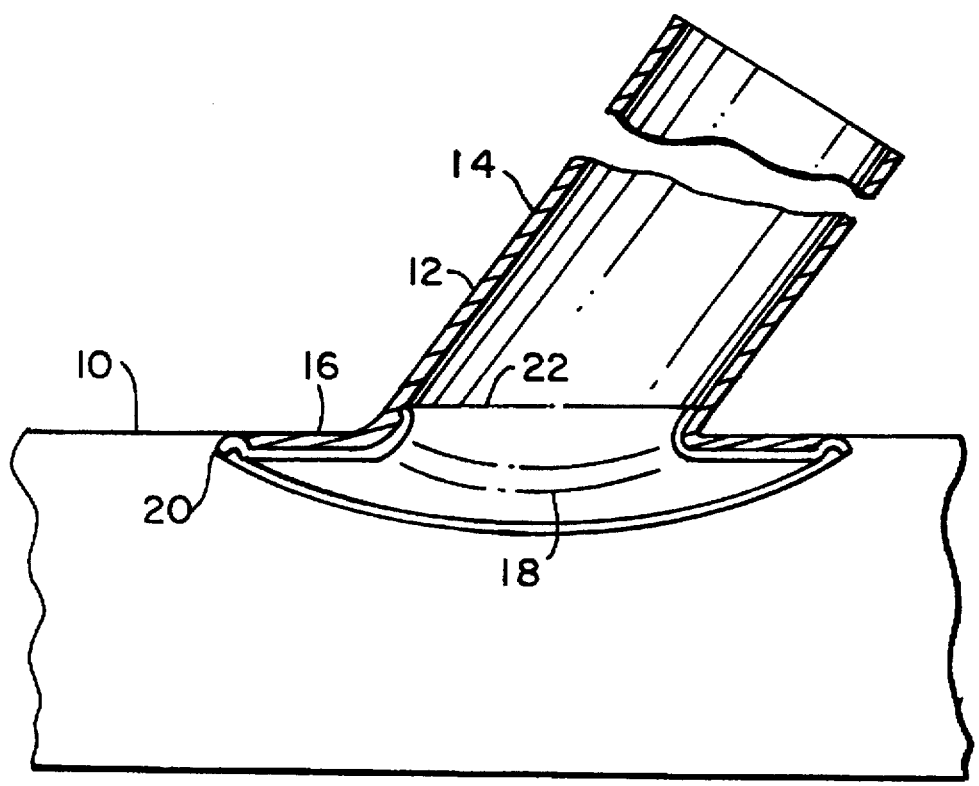
FIG. 2 shows the same portion of the underground pipeline passageway after the lateral has been lined in accordance with the method of the invention.
Figure 3:
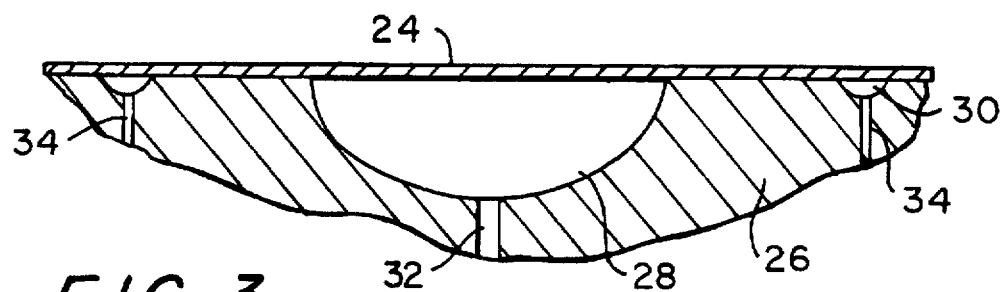
FIGS. 3–7 show in a sequence of steps the method and manufacture of the sealing collar shown in FIG. 2.

In the apparatus and method to be described, the lateral pipe (12) as shown in FIG. 2 is lined with a cured synthetic resin/felt lining tube (14) which at its lower end in FIG. 2 has a collar (16) which lies on the surface of the main pipeline or passageway (10). Additionally, there is a sealing collar (18) of plastics material which overlies the collar (16), and is provided with inner and outer bead formations (20) and (22) to provide an effective and neat sealing collar for the entire assembly. The sealing collar (18) is bonded to the lining collar (16), and provides a means whereby there will be smooth effluent flow from the lateral pipe into the main pipe.

In order to perform the operation, certain apparatus is required, and the other figures of drawings illustrate what is involved.

Referring firstly to FIGS. 3–7, under factory conditions, a sheet (24) of synthetic plastics material such as p.v.c. is vacuum formed in suitable mould (26) having a main cavity (28) and a bead cavity (30) surrounding the main cavity.

Figure 4:
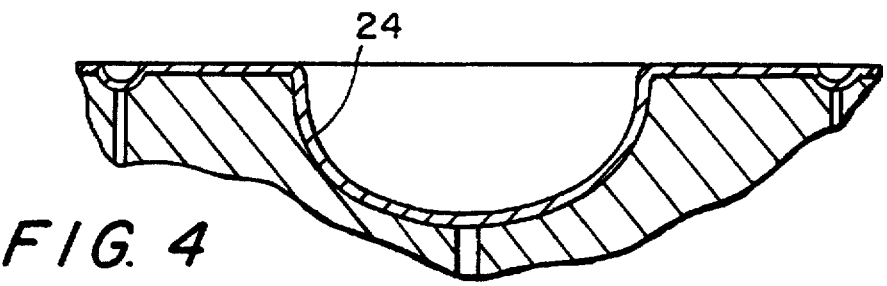

Sheet (24) is placed over the mould and suitably heated, and then the cavities (28) and (30) have vacuum applied thereto through for example pipes (32) and (34) so that the plastics material sheet is deformed as shown in FIG. 4 to take up the shape of the mould.

Figure 5:
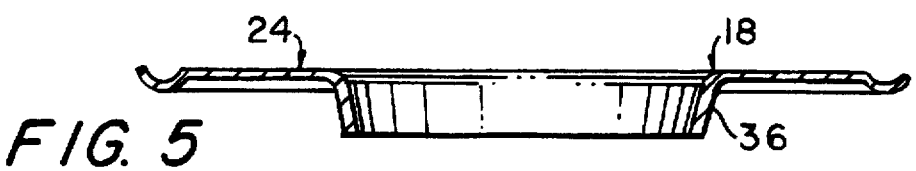

The moulding thus formed is then severed through the central deformed portion to provide the collar (18) as shown in FIG. 5, and the collar (18) is provided with a central flange (36) which is configured at an angle by means of a hot

Figure 6:
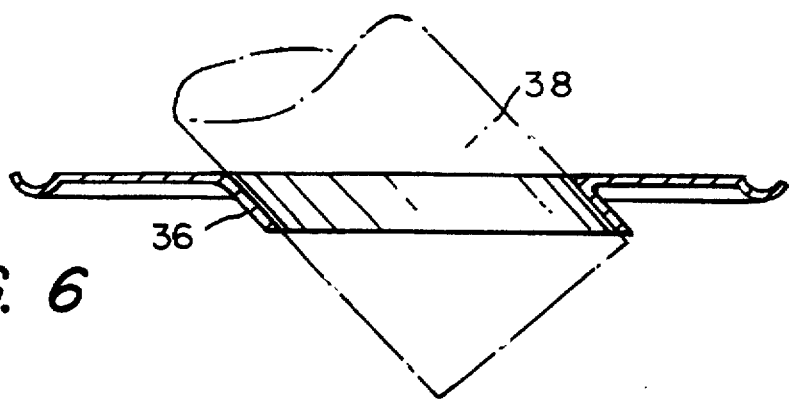

4 forming tube (38) as illustrated in FIG. 6, the said angle being the same as the angle at which the lateral pipe (12) meets the main pipe (10).

Figure 7:
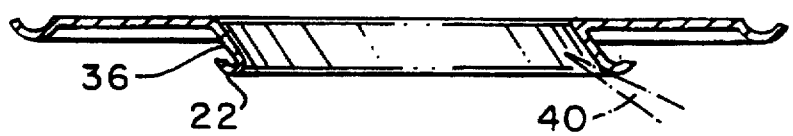

Finally, as shown in FIG. 7 heated shaper (40) is applied to the rim of the flange (36) to form the outwardly turned bead formation (22) as previously described in relation to FIG. 2, completing the manufacture of the sealing collar.

Figure 8:
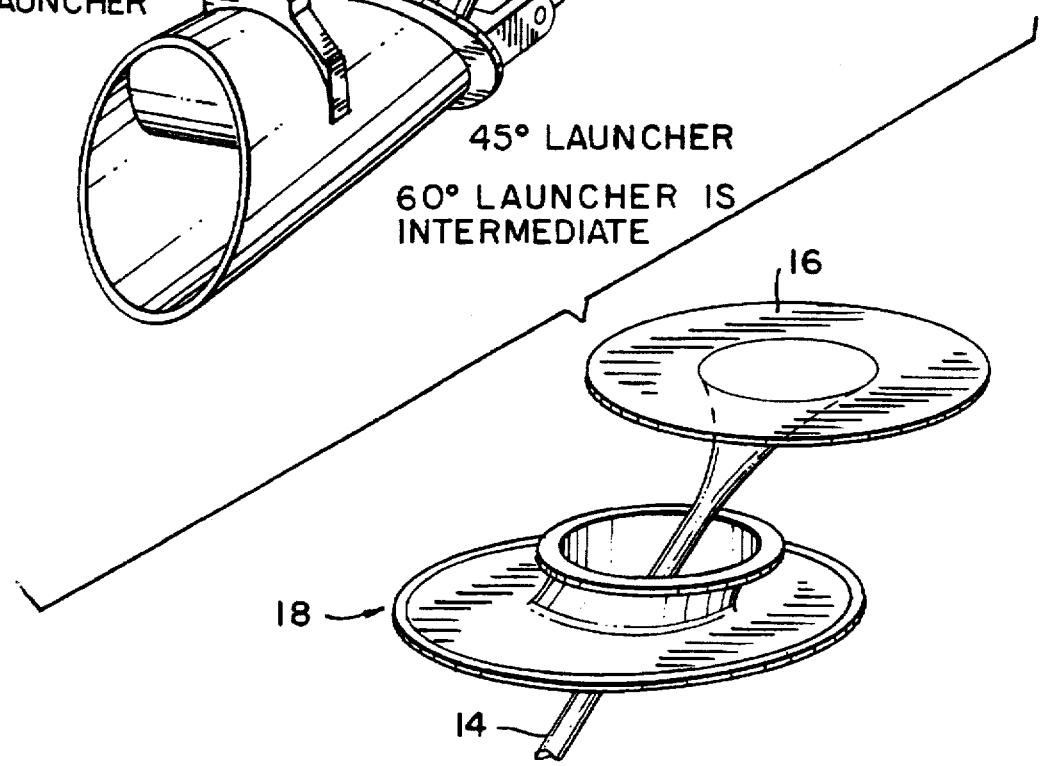
FIG. 8 shows how the sealing collar and lining tube are brought together.

With references made to FIG. 8, the sealing collar (18) is shown, after having been inverted from its FIG. 7 position, and the lining tube (14) with its collar (16) is inserted again under factory conditions, through the central aperture of the collar (18), until the collar (16) seats on collar (18). The collar (16) although of the same material as the lining tube (14) is not in fact impregnated with resin at this time, but it is bonded to the upper surface of collar (18) by a suitable adhesive or cement and again this fabrication takes place under factory conditions.

Figure 9:
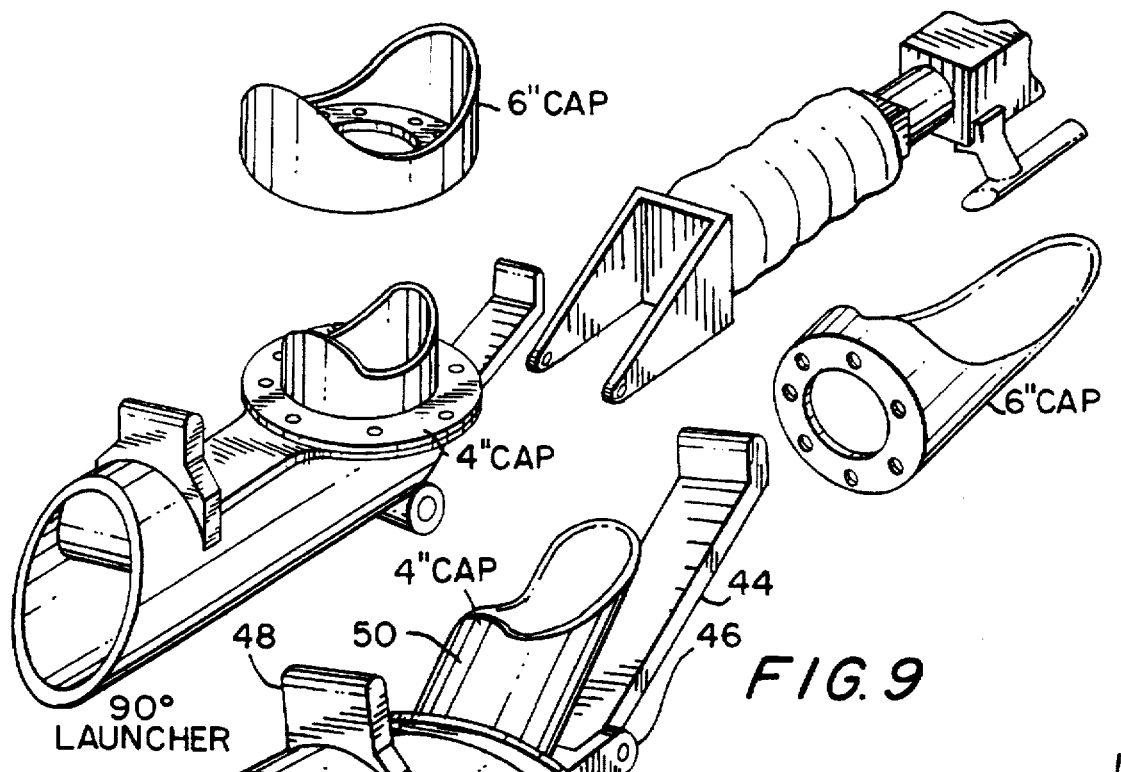
FIG. 9 is a perspective view of a "launcher" apparatus which is used for inserting a lining tube in the lateral tube shown in FIG 1.

In order to apply the lining to the lateral passageway (14) it is necessary to be loaded into a "launcher" equipment, which is illustrated in FIG. 9.

The "launcher" comprises basically a tubular body (42) supporting a front arm (44) via a bracket (46), and a saddle bracket (48).

Between the brackets (44) and (48) is a mounting cap (50) which is a tubular structure through which the lining and the carrier tube (to be described) pass in order to effect the eversion of the lining tube into the lateral pipe (14).

The cap (50) is inter changeable with caps of different sizes depending upon the diameter of the lateral pipe to be lined, and it will be appreciated that the lining tube is tailored under factory conditions to be the correct size no line the lateral pipeline (14).

Figure 10:
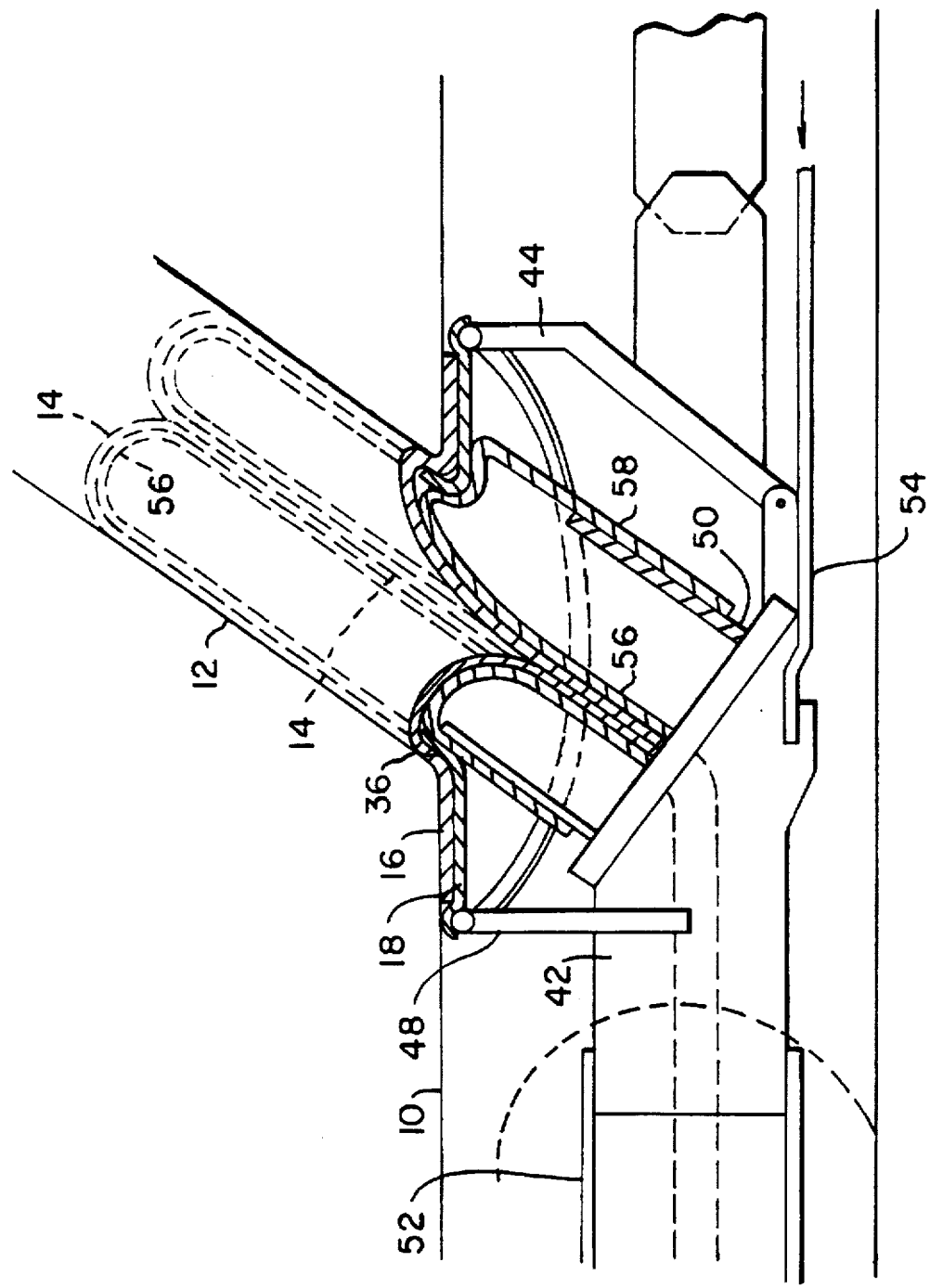
FIG. 10 is a sectional side view of the pipeline or passageway with the "launcher" in position therein to insert the lining tube in the lateral pipeline or passageway.

FIG. 10 shows the "launcher" when in position in the main pipe (10) and when in register with the lateral pipe (12) ready to evert the lining tube (14) into the lateral pipe (12), and referring to that figure., the body (42) is shown as being connected to a tail pipe (52) which is flexible, and serves as a containment means for pressurising gas e.g. compressed air, which is introduced into the interior of the body (42) by means of a compressed air line (54), in order to pressurise a chamber comprising the inside of the body (42) containment tube (52) and the cap (50).

As shown in FIG. 10, a carrier tube (56) which is of flexible resilient material such as a rubberised fabric, has an end (58) folded over the outside of the cap (50), and the remainder of the carrier tube passes through the pressurising chamber. The main body of the lining tube (14) is carried inside the carrier tube, but the flanged end (16) projects therefrom and presses on the collar (18). The collar (18) is in turn supported on the arm (44) and bracket (48) so as to be presented to the lateral lining pipe (12) as shown in FIG. 10.

When the "launcher" thus assembled is in position jacking feet or other suitable means on the "launcher" are operated, from ground level, to jack the "launcher" upwardly towards the lateral pipe (12) so that the sealing collar (18) is pressed against the surface of the main pipe (10), and deflects into curved configuration as shown in FIG. 10 and seals against this surface, the flange (36) of the sealing collar entering the mouth of the lateral pipe (12). When the "launcher" and the sealing collar are in this position, the interior of the "launcher" is pressurised via the compressed air pipe (54), and this causes the carrier tube and lining tube to evert into the lateral pipe (12) as shown in dotted lines in FIG. 10 and so the lining tube everts into and onto the surface of the lateral pipe (12).

When the lining tube includes a curable resin impregnated fibrous or felt layer, the lining is held in this position by the carrier tube until the resin cures, when the carrier tube is removed leaving the lining in position as shown in FIG. 2.

Figure 11:
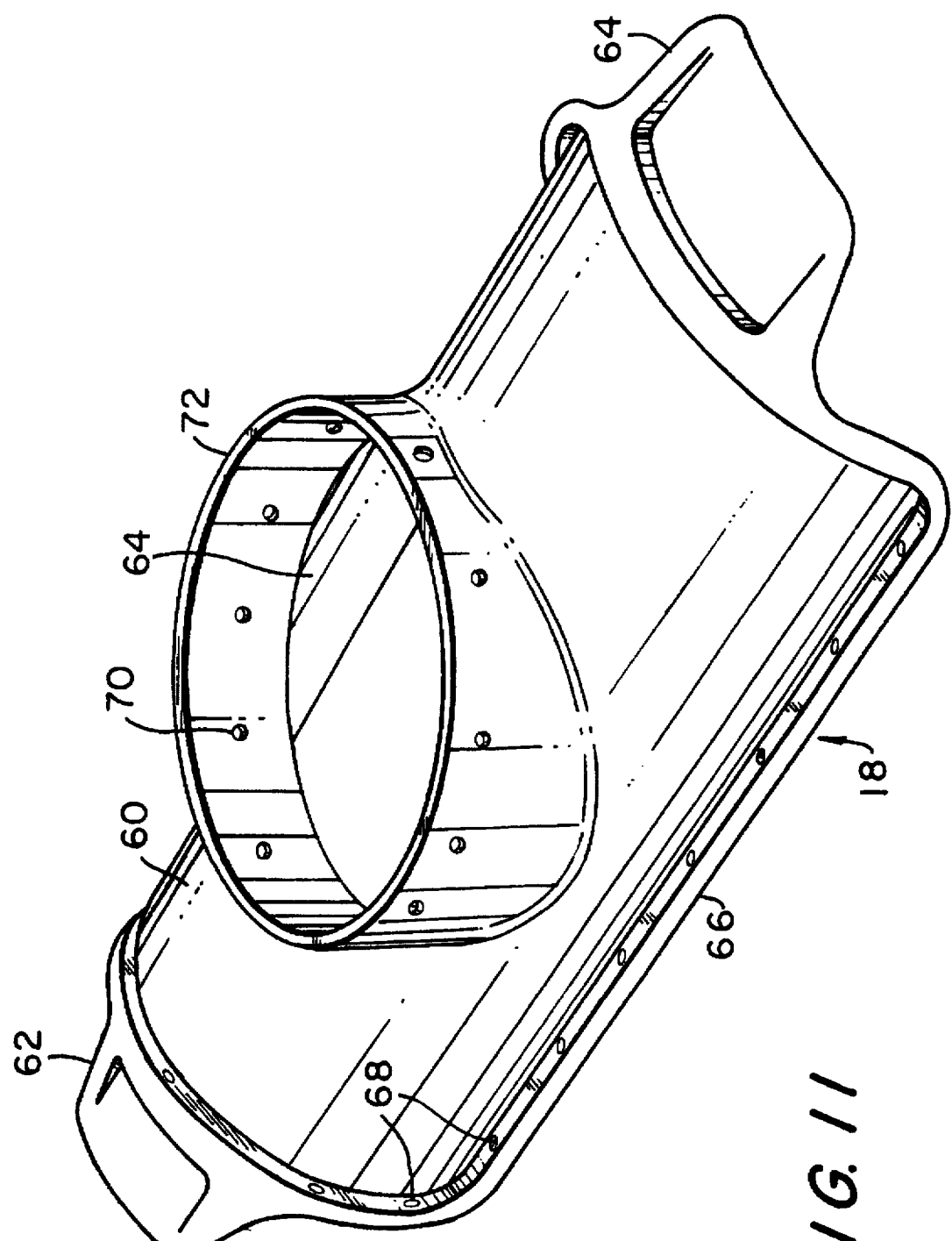
FIG. 11 is a perspective view of an alternative design of collar.

FIG. 11 shows an alternative design for the collar 18.

The collar of FIG. 11 is again thermoformed from plastics material, but is generally rectangular in shape, but in being thermoformed is curved in the main body region 60 to the curvature of the pipe.

At the ends of the body region 60 are formations 62 and 64 which are adapted to be engaged by the launcher (44 and 48).

In the centre of the body portion 60 is provided the central aperture 64 through which the lining will be everted.

It is also to be noted from FIG. 11 that around the thermoformed edge 66 are apertures 68, and similarly apertures 70 are provided in the upstanding flange 72 surrounding the aperture 64. These apertures 68 end 70 may be used for fixing devices in order to enhance the fixing of the lining collar to the thermoformed collar as shown in FIG. 11.

The FIG. 11 collar differs from the FIG. 8 collar insofar as the body portion 60 is precurved to the curvature of the pipe whereas in the arrangement of FIG. 8 the body portion is flat and will be stressed to the curvature of the pipe as it is pressed thereto.

The arrangement shown is for a lateral pipe which meets the main pipe at an angle for example in the order of 45 degrees. Obviously the system can be adapted for the lining of laterals which meet the pipeline at different angles, and for laterals which are of different sizes. A single "launcher" may be used for all sizes of lateral pipes which meet a main pipe at the same angle, and also "launchers" can be designed for other angles such as 60 degrees or even 90 degrees.

It is claimed:

1. A tubular lining for lining a lateral pipe branching off from a main pipe comprising a substantially flexible tubular lining tube portion with an integral flexible sealing end for cooperating with the inner face of the main pipe in the region where the lateral pipe is connected to the main pipe, and said flexible sealing end includes a flexible resin absorbent end collar portion and a preformed sealing collar having a body portion with an aperture and a rim surrounding said aperture on one side of the body portion arranged so that when applying the lining to the lateral pipe from the main pipe, the body portion is located against a portion of the main pipe with the resin absorbent collar portion therebetween and the rim is located in a portion of the lateral pipe and the preformed sealing collar seals the region where the lateral pipe meets the main pipe and the resin absorbent layer extends along the inner surface of the main pipe.

2. The lining according to claim 1, wherein said sealing collar is thermoformed from a sheet of synthetic plastic material.

3. The lining of claim 2, wherein the synthetic plastic material is polyvinyl chloride.

4. The lining according to claim 1, wherein the rim forms a cylinder having a longitudinal axis inclined in relation to the body of the collar at the same angle at which the lateral is inclined relative to the main pipe.

5. The lining according to claim 1, wherein the lining tube is contained within a carrier tube.

6. The lining according to claim 1, wherein the rim top is outwardly turned so as to provide a lip which serves as a means for gripping the resin absorbent material arranged to extend along the main pipe.

7. The lining according to claim 1, wherein the resin absorbent material arranged to extend along the main pipe is adhered to the sealing collar by means of a suitable adhesive or other bonding material.

8. A method for lining a lateral pipe branching off from a main pipe, comprising;

providing a lining tube with a substantially flexible resin absorbent tubular lining portion and an integral sealing end which includes a flexible resin absorbent end collar portion and a preformed sealing collar having a body portion with an aperture and a rim surrounding said aperture on one side of the body portion;

positioning the integral sealing end in the main pipe at the entrance to the lateral pipe with the sealing collar body portion along the inner surface in the main pipe and the rim portion extending into the lateral pipe and the resin absorbent layer of the sealing end along the inner surface in the main pipe;

inserting the tubular lining portion into the lateral pipe by a fluid medium under pressure to urge the lining portion against the lateral;

pressing the preformed sealing collar from inside the main pipe to the region where the lateral pipe meets the main pipe so that the rim locates in the lateral pipe, and the sealing end conforms and seals to the inner face of the main pipe;

everting the lining tubular portion through the body portion of the preformed collar onto the lateral pipe surface and curing the lining tubular portion in the lateral pipe and resin absorbent layer in the main pipe.

9. The method according to claim 8, including the step of inserting the lining tube into the main pipe in a launching device and pressing the sealing collar to the main pipe with the launching device.

10. The method according to claim 8, including the step of everting the lining portion by means of fluid pressure.

11. The method according to claim 8, wherein the lining portion is impregnated with a curable resin and including the step of holding the lining portion in position on the surface of the lateral until the curable resin is cured, so as to form a substantially rigid lining of said lateral surface.

12. A method of lining a lateral pipe leading into a main pipe, comprising;

providing a flexible resin impregnated lateral lining tube of finite length and open ended and having integrally formed at one end a flexible sealing end including a collar of resin impregnated material with a central opening, and a thermoplastic sealing collar having a body portion with an aperture and a rim extending on one side on the interior of the intersection of the lining portion and the resin impregnated collar portion the end of the lateral lining tube bonded to the resin impregnated collar about the opening, the resin impregnated collar adapted to extend along the main pipe and contact the interior surface of the main pipe at the location where the lateral meets the main pipe with the opposite end of the lateral lining extending into the lateral, inserting the lateral lining into the lateral pipe with and using a fluid medium under pressure expanding the lateral lining against the lateral wall, applying fluid pressure to the resin impregnated collar portion and preformed sealing collar on the surface of the main pipe to cure sealing collar against a portion of the main pipe with the rim portion in a portion of the lateral pipe with the flexible resin impregnated collar against the main pipe and form a seal at the location where the lateral meets the main pipe and applying pressure to the lateral tube portion, and curing the resin.

13. The method according to claim 12 including applying pressure to the collar by an inflatable means which is a bag or bladder.

14. The method according to claim 13, including pressing the collar against the main pipe by an inflatable means connected to an elbow pipe and inverting the lateral lining through the elbow pipe into the lateral.

* * * * *

UNITED STATES PATENT AND TRADEMARK OFFICE
CERTIFICATE OF CORRECTION

PATENT NO. : 5,692,543
DATED      : Dec. 2, 1997
INVENTOR(S) : Eric Wood

It is certified that error appears in the above-indentified patent and that said Letters Patent is hereby corrected as shown below:

On the Title page, after item 22, first column, please insert:

--[30]      Foreign Application Priority Data

Dec. 7, 1992 [GB]    United Kingdom..................9225528.0--

Signed and Sealed this

Seventeenth Day of February, 1998

Attest:

BRUCE LEHMAN

*Attesting Officer*            *Commissioner of Patents and Trademarks*